(12) United States Patent
Borisov et al.

(10) Patent No.: US 12,386,180 B2
(45) Date of Patent: Aug. 12, 2025

(54) AUGMENTED REALITY DEVICE BASED ON WAVEGUIDE WITH VARIABLE CURVATURE, METHOD FOR OPERATING THE AUGMENTED REALITY DEVICE, AUGMENTED REALITY GLASSES, OPTICAL COMPENSATOR

(71) Applicant: Samsung Electronics Co., Ltd., Suwon-si (KR)

(72) Inventors: Vladimir Nikolaevich Borisov, St. Petersburg (RU); Aleksandr Evgenyevich Angervaks, St. Petersburg (RU); Nikolay Viktorovich Muravev, Podolsk (RU); Roman Aleksandrovich Okun, St. Petersburg (RU); Gavril Nikolaevich Vostrikov, Moscow (RU); Mikhail Vyacheslavovich Popov, Krasnogorsk (RU); Jaeyeol Ryu, Suwon-si (KR); Kyusub Kwak, Suwon-si (KR); Jeonggeun Yun, Suwon-si (KR); Jongchul Choi, Suwon-si (KR); Myongjo Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 150 days.

(21) Appl. No.: 17/940,556

(22) Filed: Sep. 8, 2022

(65) Prior Publication Data
US 2023/0090308 A1    Mar. 23, 2023

Related U.S. Application Data

(63) Continuation of application No. PCT/KR2022/009994, filed on Jul. 8, 2022.

(30) Foreign Application Priority Data

Sep. 22, 2021  (RU) .......................... RU2021127848

(51) Int. Cl.
  G02B 6/00      (2006.01)
  F21V 8/00      (2006.01)
  G02B 27/01     (2006.01)

(52) U.S. Cl.
  CPC ....... *G02B 27/0172* (2013.01); *G02B 6/0016* (2013.01); *G02B 6/0035* (2013.01); *G02B 2027/011* (2013.01); *G02B 2027/0178* (2013.01)

(58) Field of Classification Search
  CPC ........................... G02B 6/0172; G02B 6/0035
  (Continued)

(56) References Cited

U.S. PATENT DOCUMENTS 9,733,475 B1 *  8/2017  Brown ................... G02B 6/003
10,215,986 B2   2/2019  Tervo
(Continued)

FOREIGN PATENT DOCUMENTS

CN    108089254 A       5/2018
CN    117666138 A  *    3/2024
(Continued)

OTHER PUBLICATIONS

Russian Decision on Grant dated May 27, 2022, issued in Russian Application No. 2021127848.
(Continued)

*Primary Examiner* — Kaveh C Kianni
(74) *Attorney, Agent, or Firm* — Jefferson IP Law, LLP

(57) ABSTRACT

The disclosure relates to augmented reality devices, and more particularly, to augmented reality glasses and methods for operating the same. An augmented reality display device
(Continued)

is provided. The augmented reality display device includes a projection system, an optical compensator positioned after the projection system, and a flexible waveguide. The flexible waveguide can change its curvature and comprises an input diffraction grating and an output diffraction grating. The optical compensator is configured to introduce pre-distortion to the image and optically zoom the image received from the projection system, the pre-distortion in the image and optical zoom of the image being opposite to those introduced by the flexible waveguide to the undistorted image in accordance with chosen radius of the flexible waveguide. Flexible diffraction grating distorts the pre-distorted image. The output diffraction grating outputs undistorted image to a user's eyes.

6 Claims, 12 Drawing Sheets

(58) Field of Classification Search
USPC .......................................................... 385/37
See application file for complete search history.

(56) References Cited

U.S. PATENT DOCUMENTS

| | | | |
|---|---|---|---|
| 10,228,565 B1 | 3/2019 | Saarikko | |
| 10,809,537 B1 | 10/2020 | Lam et al. | |
| 2010/0149073 A1* | 6/2010 | Chaum | G02B 27/0075 345/8 |
| 2012/0075168 A1* | 3/2012 | Osterhout | G06F 3/017 345/8 |
| 2012/0194550 A1* | 8/2012 | Osterhout | G06F 1/163 345/633 |
| 2012/0212398 A1* | 8/2012 | Border | G06Q 30/02 345/8 |
| 2012/0212400 A1* | 8/2012 | Border | G02B 27/017 345/8 |
| 2012/0235884 A1* | 9/2012 | Miller | G06F 3/013 345/8 |
| 2013/0051730 A1* | 2/2013 | Travers | G02B 27/4272 385/37 |
| 2013/0127980 A1* | 5/2013 | Haddick | G06F 3/013 348/14.08 |
| 2013/0278631 A1* | 10/2013 | Border | G06F 3/04842 345/633 |
| 2017/0184848 A1* | 6/2017 | Vallius | G02B 27/4261 |
| 2017/0285349 A1 | 10/2017 | Ayres et al. | |
| 2017/0293145 A1* | 10/2017 | Miller | G02B 27/0172 |
| 2017/0322419 A1* | 11/2017 | TeKolste | G02B 27/0081 |
| 2018/0059297 A1* | 3/2018 | Peroz | G06F 3/011 |
| 2018/0143509 A1* | 5/2018 | Oh | G02B 6/0076 |
| 2018/0164627 A1* | 6/2018 | Oh | G02B 27/0172 |
| 2018/0196263 A1* | 7/2018 | Vallius | G02B 27/0172 |
| 2018/0239177 A1* | 8/2018 | Oh | G02B 5/30 |
| 2018/0275350 A1* | 9/2018 | Oh | G02B 5/1833 |
| 2018/0284460 A1* | 10/2018 | Cheng | G02B 27/1046 |
| 2018/0356639 A1* | 12/2018 | Schaefer | G02F 1/0136 |
| 2019/0004325 A1* | 1/2019 | Connor | G02B 27/0172 |
| 2019/0072767 A1* | 3/2019 | Vallius | H04N 9/646 |
| 2019/0086674 A1* | 3/2019 | Sinay | G02B 27/0172 |
| 2019/0107719 A1* | 4/2019 | Edwin | G02B 27/0172 |
| 2019/0129178 A1* | 5/2019 | Patterson | G02B 27/0081 |
| 2019/0227375 A1* | 7/2019 | Oh | G02F 1/133526 |
| 2019/0272802 A1 | 9/2019 | Haba et al. | |
| 2019/0333480 A1* | 10/2019 | Lang | G06F 3/011 |
| 2020/0012095 A1* | 1/2020 | Edwin | G02B 27/0176 |
| 2020/0088931 A1 | 3/2020 | Urness et al. | |
| 2020/0192130 A1* | 6/2020 | Maimone | G02B 27/0172 |
| 2020/0368616 A1* | 11/2020 | Delamont | H04N 13/239 |
| 2021/0011305 A1 | 1/2021 | Chang et al. | |
| 2021/0231986 A1* | 7/2021 | Oh | G02B 30/40 |
| 2021/0247719 A1 | 8/2021 | Waldern et al. | |
| 2021/0294106 A1* | 9/2021 | Meitav | H04N 9/31 |
| 2021/0311310 A1* | 10/2021 | Trisnadi | G02B 27/0172 |
| 2021/0311316 A1* | 10/2021 | TeKolste | G02B 6/0076 |
| 2021/0318566 A1* | 10/2021 | Oh | G02F 1/133757 |
| 2021/0397004 A1* | 12/2021 | Schowengerdt | G02B 27/0093 |
| 2022/0011578 A1* | 1/2022 | Sinay | G02B 6/0023 |
| 2022/0035161 A1* | 2/2022 | Sinay | G02B 27/0172 |
| 2022/0050298 A1* | 2/2022 | Klug | G09G 3/32 |
| 2022/0082824 A1* | 3/2022 | Jarvenpaa | G02B 27/0101 |
| 2022/0099977 A1* | 3/2022 | Meitav | G02B 27/0093 |
| 2022/0171190 A1* | 6/2022 | Trisnadi | H04N 13/398 |
| 2023/0393398 A1* | 12/2023 | Oh | G06F 3/013 |
| 2024/0201429 A1* | 6/2024 | Vostrikov | G02B 27/0172 |
| 2024/0248313 A1* | 7/2024 | Komanduri | G02B 26/06 |

FOREIGN PATENT DOCUMENTS

| | | |
|---|---|---|
| WO | 2020/136306 A1 | 7/2020 |
| WO | 2021/097900 A1 | 5/2021 |
| WO | 2021/113911 A1 | 6/2021 |

OTHER PUBLICATIONS

Russian Search Report dated May 27, 2022, issued in Russian Application No. 2021127848.
International Search Report dated Oct. 24, 2022, issued in International Application No. PCT/KR2022/009994.
A.R.L. Travis et al., Curved wedges and shearing gratings for augmented reality, Proceedings of Spie, vol. 10676, May 21, 2018, XP060107918.
Adrian R.L. Travis et al., Wedge guides and pupil steering for mixed reality, Journal of the Society for Information Display—SID, Mar. 24, 2018, XP055487504.
Kiseung Bang et al., Curved holographic optical elements and applications for curved see-through displays, Journal of Information Display, Jan. 2, 2019, XP093213781.
European Search Report dated Oct. 22, 2024, issued in European Application No. 22873079.2.

* cited by examiner

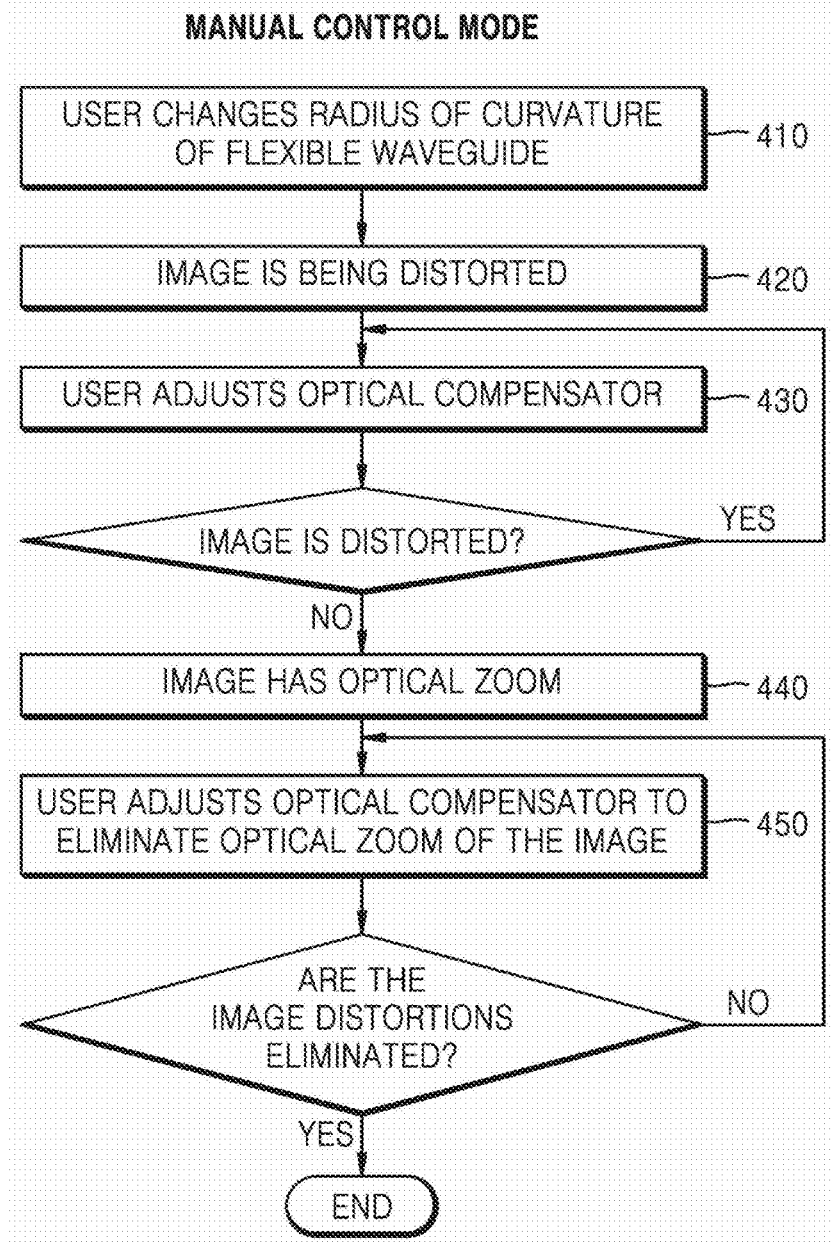

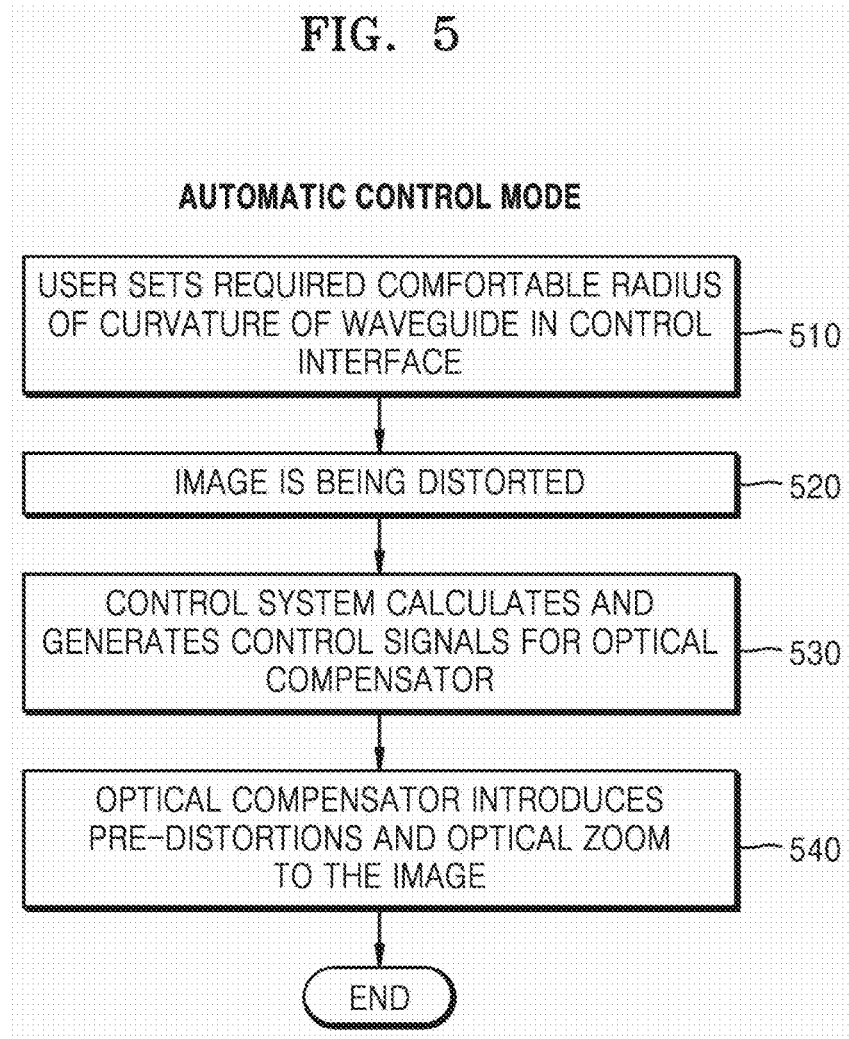

AUGMENTED REALITY DEVICE BASED ON WAVEGUIDE WITH VARIABLE CURVATURE, METHOD FOR OPERATING THE AUGMENTED REALITY DEVICE, AUGMENTED REALITY GLASSES, OPTICAL COMPENSATOR

CROSS-REFERENCE TO RELATED APPLICATION(S)

This application is a continuation application, claiming priority under § 365(c), of an International application No. PCT/KR2022/009994, filed on Jul. 8, 2022, which is based on and claims the benefit of a Russian patent application number 2021127848, filed on Sep. 22, 2021, in the Russian Patent Office, the disclosure of which is incorporated by reference herein in its entirety.

FIELD OF THE INVENTION

The disclosure relates to augmented reality devices. More particularly, the disclosure relates to augmented reality glasses and methods for operating the same.

DESCRIPTION OF THE RELATED ART

Wearable augmented reality (AR) glasses are a personal device which can be used as additional large screen, e.g., for smartphones or other electronic devices. Mass consumers need augmented reality glasses with wide field of view (FOV) (which is the angular characteristic showing the range of angles within which virtual images can be seen), having low weight and cost, small size and high resolution, such wearable devices can replace television (TV) and smartphones. The maximum state-of-the art field of view is 600 on the diagonal.

The requirements applied to systems of augmented reality glasses include:
 wide field of view, enabling the human eye to embrace the entire area seen by it, the ability of superimposing virtual images on a large area;
 high image quality, high resolution, high contrast, or the like;
 low weight;
 small size;
 low cost;
 high resolution, high contrast, or the like.

It is worth noting that augmented reality glasses require unification in mass production, since anthropometric data of each person are individual, therefore, the aesthetics and ergonomics of augmented reality glasses require individual parameters of the waveguide, in particular, the radius of curvature. Different curvatures of the waveguide have a different effect on homocentricity of beams within the waveguide and at its exit. In achieving such requirements, there arise problems associated, for example, with the fact that a wide field of view requires the provision of a wide area within which the eye can see the entire image completely, without loss.

The technology currently applied for manufacturing augmented reality devices is based on planar waveguides with diffractive optical elements. Such devices have low weight, small size, low cost, and they can provide a wide field of view, wide eye motion box, and high transmittance, that is, high transmission of a real image.

Widely used augmented reality glasses are based on planar waveguides, i.e., waveguides representing a plate with two plane-parallel planes. However, in the devices the edges, where the virtual image projectors are positioned, are far from the temporal part of the user's head, so such glasses take up a lot of space in use.

There are also used curved waveguides, which go around the user's head, such glasses are more compact and comfortable, have less weight, smaller size, and the devices are more ergonomic and aesthetic. However, the curved waveguide adds distortion to the augmented reality image.

When a parallel beam is incident on a curved waveguide, light is introduced into the waveguide by an input diffraction grating. Plane wavefront beam, in which rays propagate parallel to each other, transforms to spherical wavefront beam, in which rays are converging to a certain point, the waveguide front being bent differently for different curvatures. This effect must be taken into account and compensated for when making augmented reality glasses from curved waveguides.

U.S. Pat. No. 9,733,475 B1 (publication date 15 Aug. 2017) discloses an augmented reality system comprising a cylindrical waveguide with a projection system, which has a built-in image distortion system compensating for the distortions introduced by the cylindrical waveguide. However, in the augmented reality system, an image is input from above. Moreover, the system is stationary and cannot adapt to a change in the waveguide curvature, it is rather computed and designed for a specific curvature of the waveguide.

U.S. Ser. No. 10/809,537 B1 (publication date 20 Oct. 2020) is chosen as the closest prior art. The document discloses a waveguide display. The waveguide display comprises a light source, a projection unit, an input waveguide of the light source and an output waveguide. The input waveguide has an adjustable curvature for refocusing the image. A narrow collimated beam is fed from a laser into the first waveguide, by the effect of bending the waveguide, light scans over the field and propagates, thereby an image is formed and this image moves along one axis. The second waveguide is orthogonal to the first waveguide and contains a diffraction grating with the lines that are orthogonal to the lines of the diffraction grating of the first waveguide. The second waveguide works in the same way as the first waveguide, and synchronously with the first waveguide, but due to the fact that the waveguides are orthogonal to each other, the image can be moved along two axes. Unlike the classical system, where the image is formed to infinity, in this case, due to changing the waveguide curvature, the image can move along two axes. Drawbacks of the device include structural complexity (use of two waveguides), elaborated image formation with a laser beam, and refocusing of virtual image, which introduce additional distortions in the image.

Therefore, a need exists for an easy-to-manufacture, compact and convenient augmented reality display device for augmented reality glasses with a wide field of view. Augmented reality glasses should be adjustable by the user to fit the shape of the head and face of each specific user.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide augmented reality glasses and methods for operating the same.

Additional aspects will be set forth in part in the description which follows and, in part, will be apparent from the description, or may be learned by practice of the presented embodiments.

In accordance with an aspect of the disclosure, an augmented reality display device is provided. The augmented reality display device includes a projection system, an optical compensator positioned after the projection system, a flexible waveguide configured to change the radius of curvature, comprising an input diffraction grating and an output diffraction grating, wherein the projection system is configured to project an undistorted image on the optical compensator, the optical compensator is configured to introduce pre-distortion to the image and optically zoom the image received from the projection system, i.e., to change angular size of the image received from the projection system, the pre-distortion in the image and optical zoom of the image being opposite to those introduced by the flexible waveguide to the undistorted image in accordance with chosen radius of the flexible waveguide, the input diffraction grating of the flexible waveguide is configured to input the image having pre-distortion and optical zoom to the flexible waveguide, the flexible waveguide is configured to compensate for the image pre-distortion and optical zoom received from the optical compensator, the output diffraction grating of the flexible waveguide is configured to output the image. Moreover, the device further comprises a flexible frame that contains, secured therein, the projection system, the optical compensator, and the flexible waveguide.

In accordance with another aspect of the disclosure, a method of operating an augmented reality display device is provided. The method includes bending a flexible waveguide, thereby changing a radius of curvature of the flexible waveguide, projecting an undistorted image by a projection system so that the undistorted image is incident on an optical compensator, distorting the undistorted image by the optical compensator to produce a pre-distorted and optically zoomed image by adjusting the optical compensator so that distortion in the pre-distorted and optically zoomed image becomes opposite to those introduced by the flexible waveguide to the undistorted image in accordance with the radius of curvature of the flexible waveguide, inputting the pre-distorted and optically zoomed image to the flexible waveguide by an input diffraction grating, compensating for the distortion in the pre-distorted and optically zoomed image by the flexible waveguide to produce an undistorted image, outputting the undistorted image by an output diffraction grating to a user's eye. Moreover, the bending of the flexible waveguide is performed by the user. Moreover, the distorting of the undistorted image by the optical compensator is performed by the user through manually adjusting the optical compensator. Moreover, the distorting of the undistorted image by the optical compensator is performed automatically as a function of the value of the radius of curvature of the flexible waveguide.

In accordance with another aspect of the disclosure, augmented reality glasses are provided. The augmented reality glasses include a flexible frame that contains, secured therein, a left eye element and a right eye element, each of the left and right eye elements comprising the inventive augmented reality display device, wherein the flexible waveguide of each of the right eye element and left eye element is positioned such that output of the undistorted image is performed to a user's eyes. Moreover, the projection system is positioned in a user's temporal region. Moreover, the glasses further comprise an optical compensator regulator configured to enable the user to adjust the optical compensator for introducing pre-distortions to the image and optically zooming the image received from the projection system, wherein the user adjusts the optical compensator until the undistorted image is seen. Moreover, the glasses can further comprise a control interface, a control system, an actuator, curvature sensors, wherein the control interface is configured to receive a value of the radius of curvature of the waveguide from the user, transmit a signal to the control system to change the radius of curvature of the waveguide, the curvature sensors are configured to determine current radius of curvature of the waveguide and transmit the value of the current radius of curvature to the control system, the control system is configured to control the actuator in response to the signal from the control interface, the actuator being adapted to change the radius of curvature of the flexible waveguide by changing the curvature of the flexible frame, calculating and generating control signals for the optical compensator to cause the optical compensator to introduce pre-distortions to the image and optically zoom the image, opposite to the distortions introduced by the flexible waveguide, in accordance with the radius of curvature of the flexible waveguide.

In accordance with another aspect of the disclosure, augmented reality glasses are provided. The augmented reality glasses include a flexible frame that contains, secured therein, a single element for the left eye and the right eye, the single element comprising the inventive augmented reality display device, wherein the flexible waveguide is positioned such that the undistorted image is outputted to the user's eyes. Moreover, the glasses comprise an additional projection system and an additional optical compensator positioned after the additional projection system, wherein the projection system and the additional projection system are arranged in the user's temporal region on each side of the user's head. Moreover, the glasses further comprise an optical compensator regulator configured to enable the user to adjust the optical compensator for introducing pre-distortions to the image and optically zooming the image received from the projection system, the user adjusting the optical compensator independently until the undistorted image is seen. The glasses can further comprise a control interface, a control system, an actuator, curvature sensors, wherein the control interface is configured to receive a value of the radius of curvature of the waveguide from the user, transmit a signal to the control system to change the radius of curvature of the waveguide, the curvature sensors are configured to determine current radius of curvature of the waveguide and transmit the value of current radius of curvature to the control system, the control system is configured to control the actuator in response to signal from the control interface, the actuator being configured to change the radius of curvature of the flexible waveguide by changing the curvature of the flexible frame, calculate and generate control signals for optical compensator to cause the optical compensator to introduce pre-distortions to the image and optically zoom the image, opposite to the distortions introduced by the flexible waveguide, in accordance with the radius of curvature of the flexible waveguide.

In accordance with another aspect of the disclosure, an optical compensator for an augmented reality device is provided. The optical compensator includes a part for optically zooming an image, configured to change an angular size a of the image to $\alpha'=k\alpha$, where k is a magnification factor, an optical zoom of the image being opposite of that introduced by a flexible waveguide of the augmented reality device to an undistorted image in accordance with a radius of curvature of the flexible waveguide of the augmented reality device, a part for pre-distortion of the image, configured to change the curvature of a wavefront of light forming the image received from the projection system, the change in the curvature of the wavefront being opposite to that introduced by the flexible waveguide of the augmented reality device to the light forming the undistorted image in accordance with the chosen radius of curvature of the flexible waveguide of the augmented reality device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the certain embodiments of the disclosure will be more apparent from the following description taken in conjunction with the accompanying drawings, in which:

FIG. 4 is a flowchart of operating augmented reality glasses in manual control mode according to an embodiment of the disclosure;

FIG. 5 is a flowchart of operating augmented reality glasses in automatic control mode according to an embodiment of the disclosure;

FIG. 7A compressive force, FIG. 7B tensile force according to various embodiments of the disclosure;

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
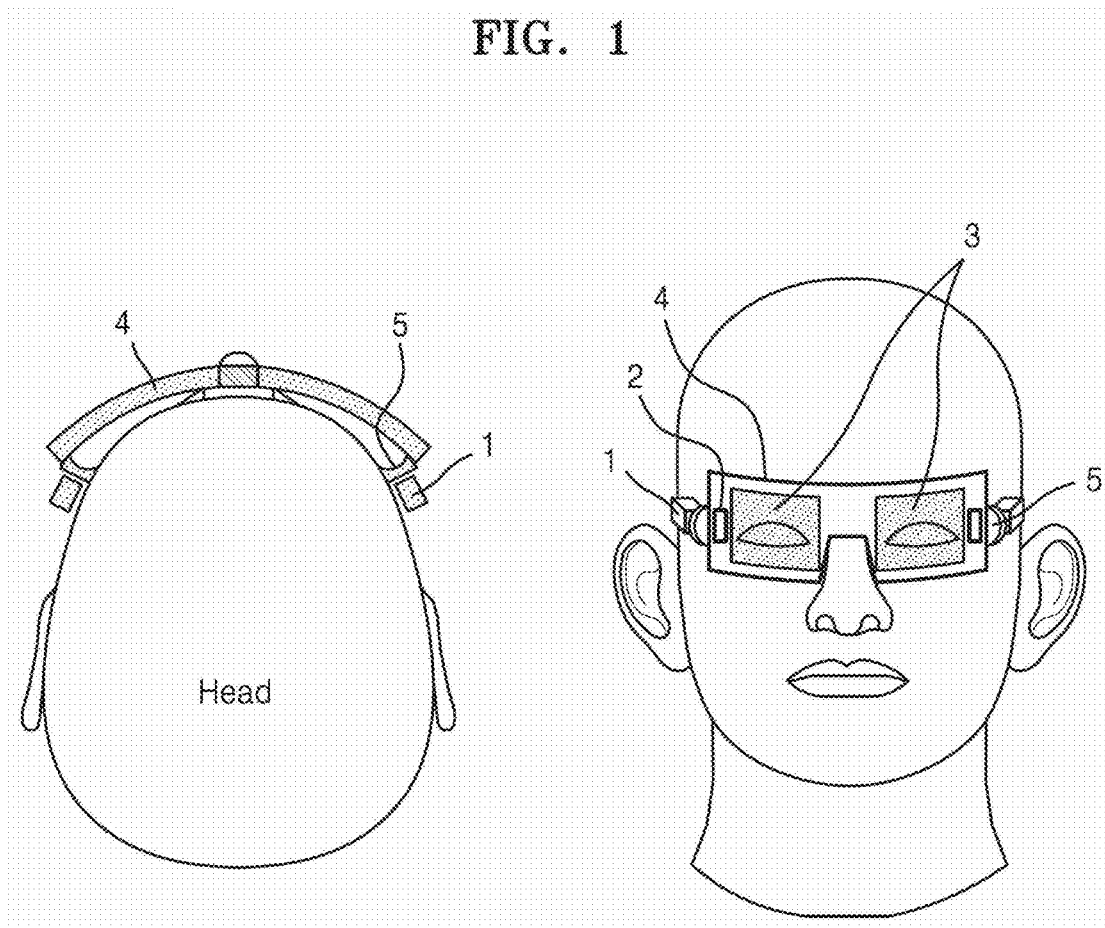
FIG. 1 is a schematic view of appearance of optical part of augmented reality glasses according to an embodiment of the disclosure.

There is provided an augmented reality device for augmented reality glasses, the appearance of which is shown in FIG. 1. In the augmented reality glasses, the radius of curvature of a waveguide 4 can be individually changed by the user to fit the head parameters of each specific user.

Curved waveguide has a significant drawback: the curvature of the waveguide introduces distortions to image, more particularly, it transforms plane wavefront into curved one and scales (increases/decreases, resizes, zooms) the image, changes the angle between the main beams at the exit from the curved waveguide relative to the angle, which was at the entrance to the curved waveguide. Furthermore, the distortion and scaling (image zoom) depend on the curvature of the waveguide, the larger the curvature, the more distortions and the greater zoom of the image. However, this effect can be corrected by preliminary distortion (pre-distortion) of the image and preliminary zooming of the image before input of the image to the flexible waveguide.

For this purpose, the augmented reality display device uses an optical compensator tunable according to the value of distortion that would be introduced when passing through a flexible waveguide. The optical compensator pre-distorts images to compensate for the distortion resulting from changing the radius of curvature of the waveguide. The optical compensator can be adjusted by the user not only to pre-distort the image and optically zoom the image, but also to compensate for the user's visual defects.

FIG. 1 illustrates schematically appearance of augmented reality glasses according to an embodiment of the disclosure.

Referring to FIG. 1, augmented reality glasses comprise a flexible waveguide 4 enclosed in a flexible frame. Radius of curvature (R1 and R2 in FIG. 3B) of the flexible waveguide 4 can be changed by the user independently so that the augmented reality glasses are conveniently positioned on the head. In the user's temporal region on each side of the head, there is provided a projection system 1 positioned on the frame, input diffraction gratings 2 positioned on the flexible waveguide 4, output diffraction gratings 3 positioned on the flexible waveguide 4 opposite each eye of the user. Optical compensator 5 is positioned immediately after the projection system 1.

Figure 2A:
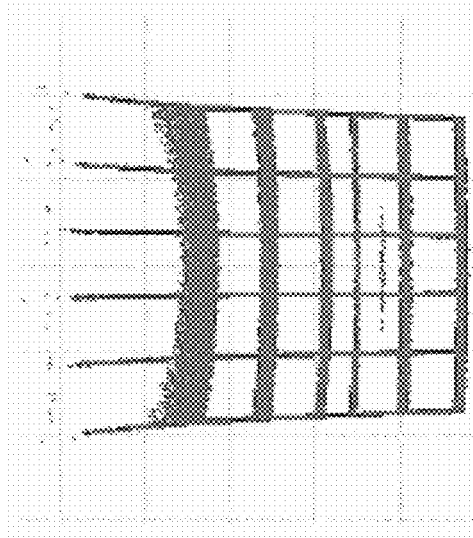
FIGS. 2A and 2B illustrate an effect of correcting an image using an optical compensator according to various embodiments of the disclosure.
Figure 2B:
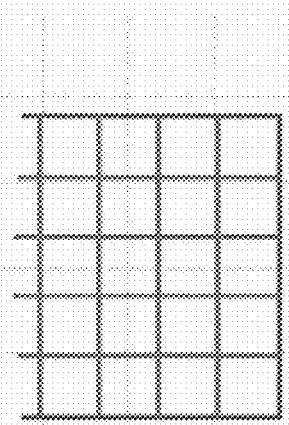

FIGS. 2A and 2B illustrates an effect of applying an optical compensator, where FIG. 2A illustrates distortion of an image resulting from the use of a curved (bent) waveguide, FIG. 2B illustrates an image when an optical compensator is applied according to various embodiments of the disclosure.

Figure 3A:
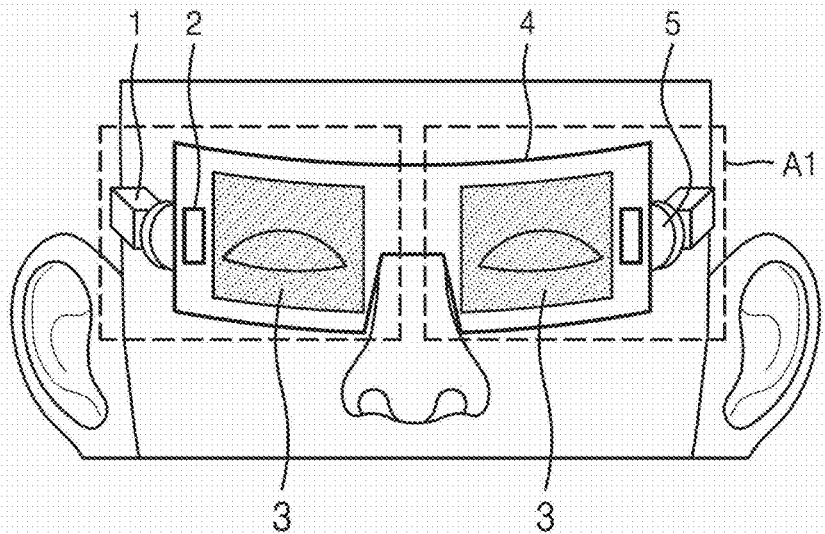
FIG. 3A illustrate appearance of augmented reality glasses worn by a user according to an embodiment of the disclosure.
Figure 3B:
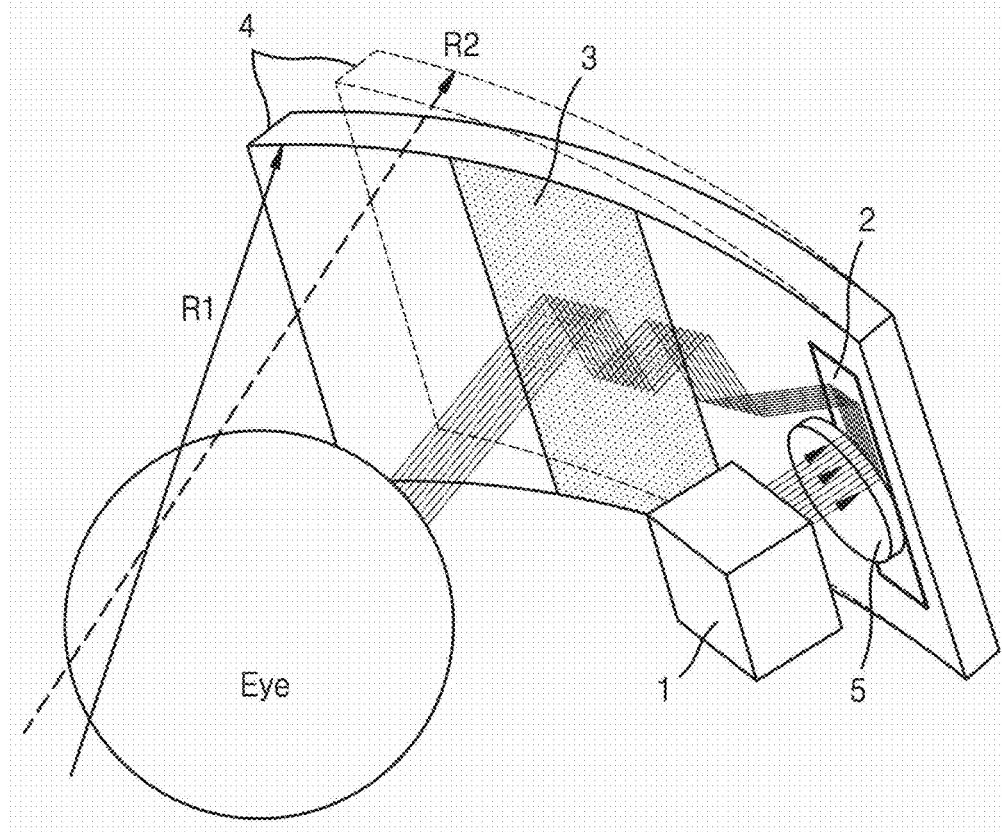
FIG. 3B illustrates an augmented reality display device according to an embodiment of the disclosure.

FIG. 3A illustrates schematically augmented reality glasses worn by a user according to an embodiment of the disclosure. FIG. 3B illustrates schematically an augmented reality glasses display device used in augmented reality glasses according to an embodiment of the disclosure. For reference, FIG. 3B is an enlarged view of area A1 of FIG. 3A.

Referring to FIGS. 2A, 2B, 3A, and 3B, the augmented reality device comprises: an image projector 1, which projects an image to infinity Flexible waveguide 4 is adapted for changing its curvature by the user. Moreover, the flexible waveguide 4 comprises an input diffraction grating 2 to input an image into a flexible waveguide 4 by diffraction, and an output diffraction grating 3 to output the image from the waveguide to the user's eye. The image propagates along the waveguide 4 from the input diffraction grating 2 towards the output diffraction grating 3 by the effect of total internal reflection (TIR) from the waveguide surfaces. The device further comprises an optical compensator 5 configured to provide a variable preliminary distortion of the image from projector, which is opposite to the distortion introduced as the result of the waveguide curvature, and to create a variable zoom of the image, which is opposite to the change in the zoom introduced by the flexible waveguide, in accordance with its radius curvature. Optical zoom refers to changing the angular size of the image.

The image projector 1 projects image to infinity. The optical compensator 5 is adjusted (manually by the user or automatically) to the current radius of curvature of the flexible waveguide 4. The image from the projection system 1, having passed through the optical compensator 5, is pre-distorted, so that the image pre-distortion and optical zoom become opposite to those introduced by the current radius of curvature of the flexible waveguide 4. When the radius of curvature of the flexible waveguide 4 changes (for example, from radius R1 to radius R2), the distortions introduced into the beam path and the image zoom change in the flexible waveguide 4, and the optical compensator 5 is adjusted by the user to the current radius of curvature of the flexible waveguide 4 manually or automatically.

Therefore, the optical compensator 5 is configured to introduce pre-distortion to image and to provide optical zoom of the image received from the projection system.

The augmented reality glasses comprise a flexible frame, in which a left eye element and a right eye element are secured, each of the left and right eye elements comprising the augmented reality device. It should be noted that the left eye element and the right eye element can, optionally, work synchronously. The flexible waveguide 4 is positioned in each of the right eye element and the left eye element so that an undistorted image is output to the user's eyes.

In another embodiment of the disclosure, augmented reality glasses comprise a flexible frame, in which only one element for left eye and right eye is secured, the element comprising one augmented reality display device. In this embodiment of the disclosure, the flexible waveguide 4 is positioned in front of the user's eyes such that the undistorted image is output to the user's eyes.

As mentioned above, the optical compensator 5 can be manually adjusted by the user.

FIG. 4 is a flowchart of operating augmented reality glasses in manual control mode according to an embodiment of the disclosure.

Referring to FIG. 4, the algorithm for operation of the augmented reality glasses is as follows:

A user puts on augmented reality glasses and, by bending the frame, changes the radius of curvature of the flexible waveguide 4. With this, the user sees a distorted and optically zoomed image. The user adjusts the optical compensator 5 using a regulator of the optical compensator 5 such that the image can be seen clearly and non-zoomed. More specifically:

In the step 410, the user changes the radius of curvature of the flexible waveguide 4. for example, the user changes the radius of curvature of the flexible waveguide 4 by bending the frame. The user can choose the radius of curvature of the flexible waveguide 4.

In the step 420, Image is distorted in accordance with the chosen radius of curvature of the flexible waveguide 4.

In the step 430, User adjusts the optical compensator 5 until the distortion is eliminated.

The augmented reality glasses can check whether the image is still distorted. If the image remains distorted, the user adjusts the optical compensator 5 until an undistorted image is seen.

In the step 440, The image has optical zoom.

In the step 450, The user adjusts the optical compensator 5 until the optical zoom of the image is eliminated.

The augmented reality glasses can check whether the image distortions eliminated. The augmented reality glasses can check whether the optical zoom of the image is eliminated. If the image remains optically zoomed, the user adjusts the optical compensator 5 until an optically non-zoomed image is seen. If the image distortions relating to the optical zoom of the image are eliminated, the process can be terminated. The user sees undistorted non-zoomed image.

The optical compensator 5 consists of movable components that provide a smooth change in wavefront distortion with the ability of manual movement of the components by the user using a regulator. Such devices are known from the prior art, an example of implementation of such systems can be a variable zoom lens used in camera lenses.

The user puts on the augmented reality glasses, changes the curvature of the waveguide at his or her discretion, and adjusts the optical compensator using the regulator independently such that viewing with the glasses is the most comfortable. The adjustment is done by any method of the related art applicable for zoom systems or systems with tunable lenses.

When adjusting the image manually with the regulator, the user can look at test virtual image, which must be clearly seen after the adjustment. Test images are known in the art, one example is television worlds that are transferred to the augmented and virtual reality region to evaluate the virtual image quality. In other words, by adjusting the optical compensator 5, the image received from the projection system 1 is distorted to produce a pre-distorted image, and the optical zoom of the image becomes the opposite of that introduced by the flexible waveguide 4 into the non-zoomed image in accordance with the chosen radius of curvature of the flexible waveguide 4. Then, the pre-distorted image enters the flexible waveguide 4, where the distortions introduced by the flexible waveguide 4 compensate for the pre-distortions introduced by the optical compensator 5. The pre-distorted image enters the flexible waveguide through the input diffraction grating 2, propagates in the flexible waveguide 4 by TIR, where the distortions introduced by the optical compensator 5 are compensated for by the distortions introduced by the flexible waveguide 4, and the image becomes undistorted. The undistorted image is output from the flexible waveguide 4 by the output diffraction grating 3 and enters the user's eyes.

The augmented reality glasses can be used after adjustment, when the image quality suits the user.

FIG. 5 is a flowchart of operating augmented reality glasses in automatic control mode according to an embodiment of the disclosure.

Referring to FIG. 5, in automatic control mode, the augmented reality glasses additionally comprise a control interface, a control system, an actuator, and curvature sensors.

In the step 510, User of automatically controlled augmented reality glasses sets the required comfortable radius of curvature of the waveguide 4 in control interface. The control interface is positioned on the frame and can be either real i.e., in the form of a regulator, or virtual that can be controlled by gestures, eyes, voice, or the like. The control interface receives value of the radius of curvature of the waveguide 4 from the user, transmits a signal to the control system to change the radius of curvature of the waveguide 4. Curvature sensors are configured to determine current radius of curvature of the waveguide 4 and to transmit the value of current radius of curvature to the control system. The control system controls the actuator in response to the signal from the control interface. The actuator is configured to change the radius of curvature of the flexible waveguide 4 by changing the curvature of the flexible frame.

In the step 520, The image may be distorted. And then in the step 530, the control system calculates and generates optical compensator control signals. In the step 540, The optical control control signals cause the optical compensator 5 to introduce pre-distortion to the image and optically zoom of the image, which are opposite to the distortions introduced by the flexible waveguide 4, in accordance with the radius of curvature of the flexible waveguide 4 chosen by the user.

If the control system is corrected in advance for visual defects of a specific user's, these visual defects can be automatically compensated for.

As noted above, the radius of curvature of the waveguide 4 can vary depending on the user's head parameters. For changing the radius of curvature, a thin plastic transparent waveguide can be used, since transparent plastic material changes its curvature well, while maintaining its shape at each radius of curvature. Material for the manufacture of the waveguide must be plastic and transparent, and the material must be able to change its shape without breakage and damage. The augmented reality glasses can be used by any user and transferred from one user to another, which is convenient, for example, for use in public places. It is worth noting that augmented reality glasses based on such a waveguide are easy in manufacture. A flat waveguide made of a bendable material can be used in the manufacture, and an input diffraction grating and an output diffraction grating are applied to it. Various architectures of augmented reality glasses and mutual arrangement of elements are well known in the art. The flexible frame allows fixing the curvature of the waveguide and is made of materials exhibiting plastic deformation.

The inventive glasses are very comfortable to use, lightweight, compact and ergonomic.

Figure 6:
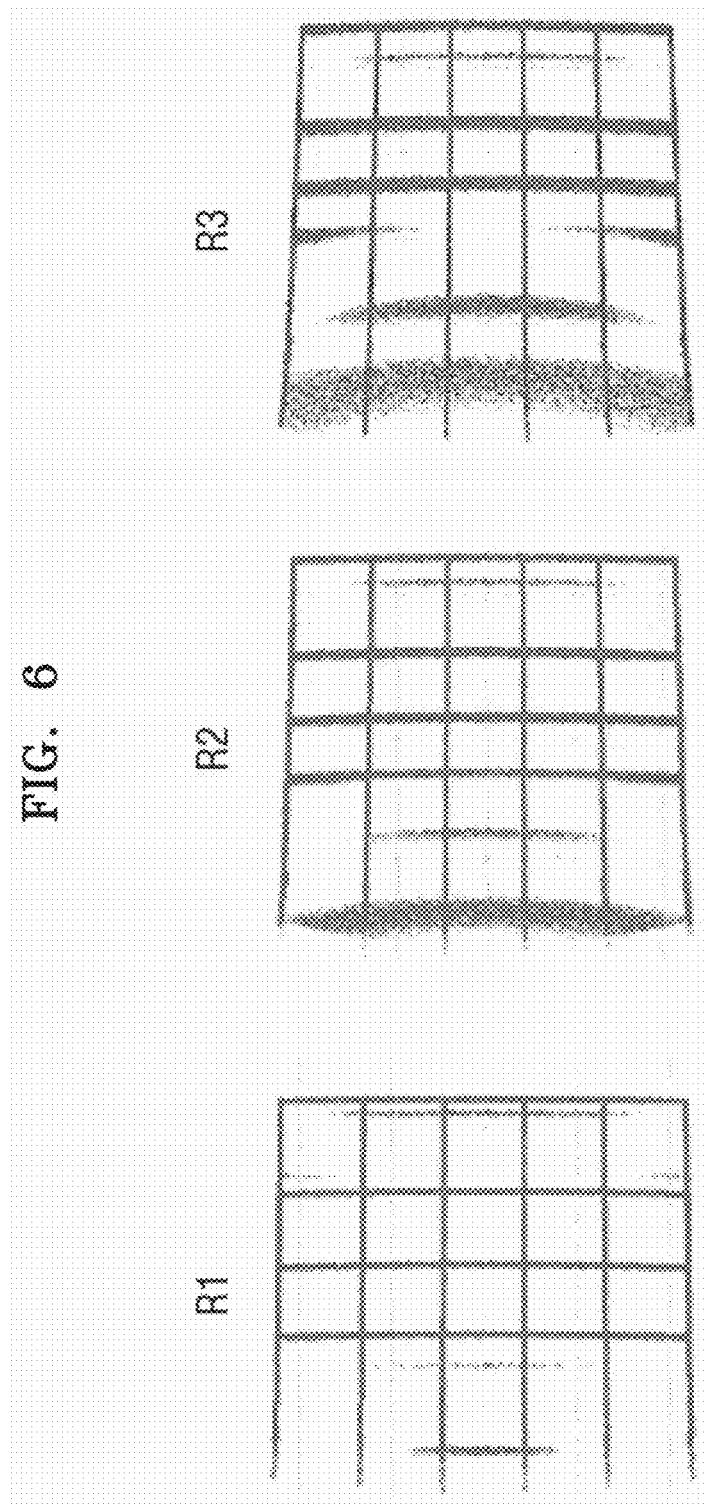
FIG. 6 illustrates degradation in an image quality as a function of change in a radius of curvature of a waveguide according to an embodiment of the disclosure.

FIG. 6 illustrates how image quality deteriorates depending on a change in a radius of curvature of a waveguide, where a first radius R1 is the smallest radius of curvature of the waveguide, a second radius R2 is the average radius of curvature of the waveguide, and a third radius R3 is the largest radius of curvature of the waveguide according to an embodiment of the disclosure.

Referring to FIG. 6, the larger the radius of curvature of the waveguide, the more the image is distorted when passing through the flexible waveguide without the use of an optical compensator 5.

Figure 7A:
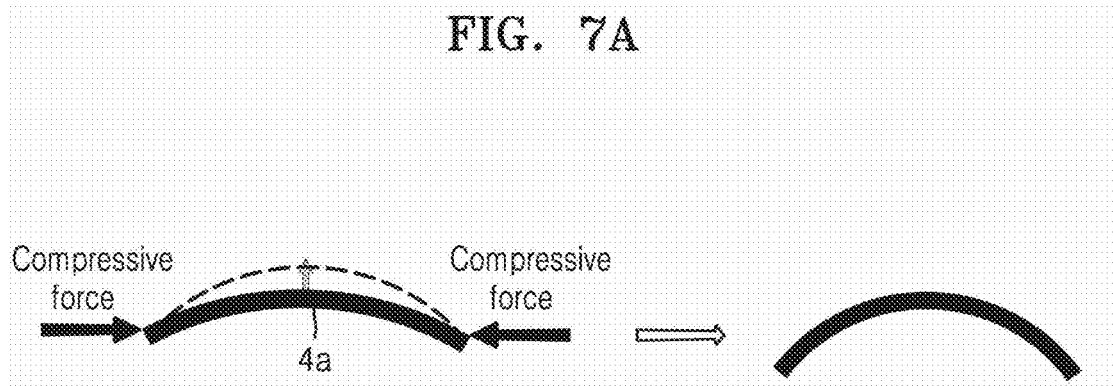
FIGS. 7A and 7B illustrate an ability of changing a radius of curvature of a waveguide under a force.
Figure 7B:
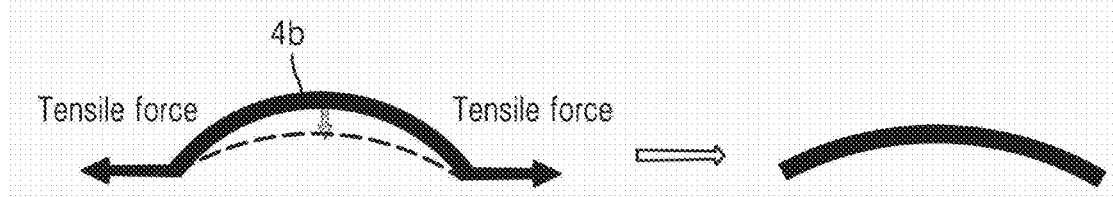

FIGS. 7A and 7B illustrate an ability of changing a radius of curvature of a waveguide under a force: FIG. 7A compressive force, FIG. 7B tensile force according to various embodiments of the disclosure.

Referring to FIGS. 7A and 7B, in an embodiment of the disclosure, to change the radius of curvature of the waveguide, it is sufficient to apply force to its edges. If the force is directed towards the center of the waveguide 4a (compressive force), the curvature of the waveguide increases. If the force is directed away from the center of the waveguide 4b (tensile force), the curvature of the waveguide decreases. To fix the changed radius of curvature, a flexible frame is used that embraces the waveguide along one of the edges or along all the edges. The frame can be made of materials exhibiting plastic deformation, that is, capable of fixing the shape. When a force is applied, the material changes its shape, and after removing the force the material retains its shape. For example, when using such a frame made of a material exhibiting plastic deformation, a flexible waveguide fixed in such a frame will retain its shape due to retaining the frame shape.

The waveguide for augmented reality glasses can be spherical, cylindrical, aspherical, and the waveguide can be flat, that is, the waveguide can have any arbitrary shape.

Figure 8A:
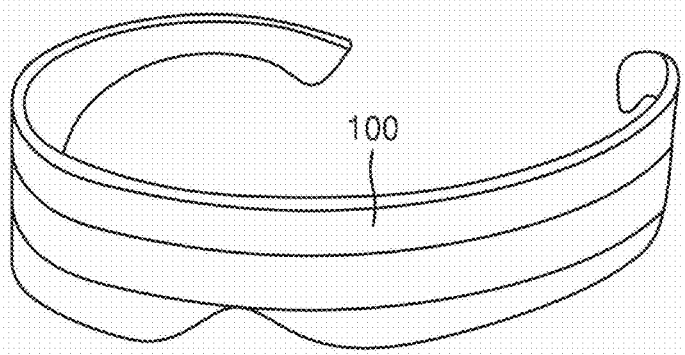
FIG. 8A illustrate augmented reality glasses made of one solid waveguide according to an embodiment of the disclosure.

FIG. 8A illustrates augmented reality glasses 100 made of one solid waveguide according to an embodiment of the disclosure.

Referring to FIG. 8A augmented reality glasses 100 may be formed from a solid waveguide enclosed in a frame. With this design, only one projector and one optical compensator can be used, since only one image can be used for both eyes.

Figure 8B:
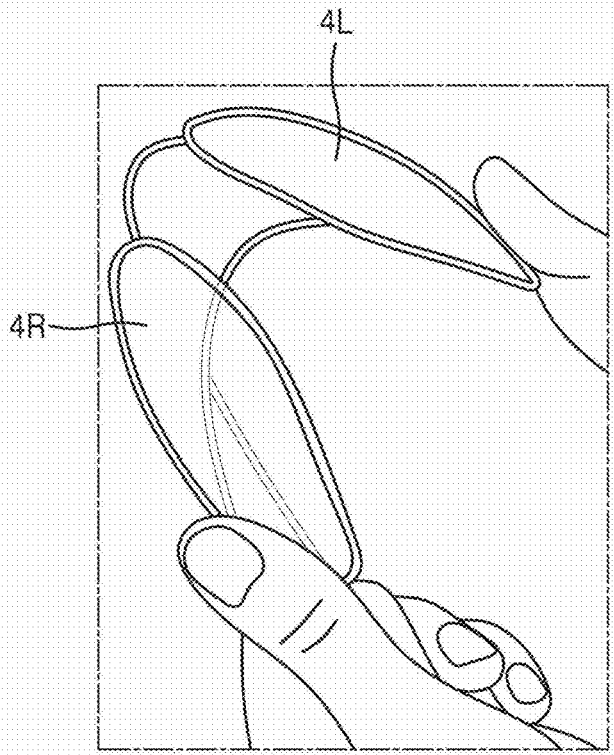
FIG. 8B illustrates augmented reality glasses made of two separate waveguides according to an embodiment of the disclosure.

FIG. 8B illustrates augmented reality glasses made of two separate waveguides (4L, 4R) according to an embodiment of the disclosure.

Referring to FIG. 8B, two separate projectors and optical compensators can be used to transfer images separately for the right eye and for the left eye.

The glasses may be hold by traditional temples passing over the ears, or they may be hold by a rim passing around the user's head.

Figure 9:
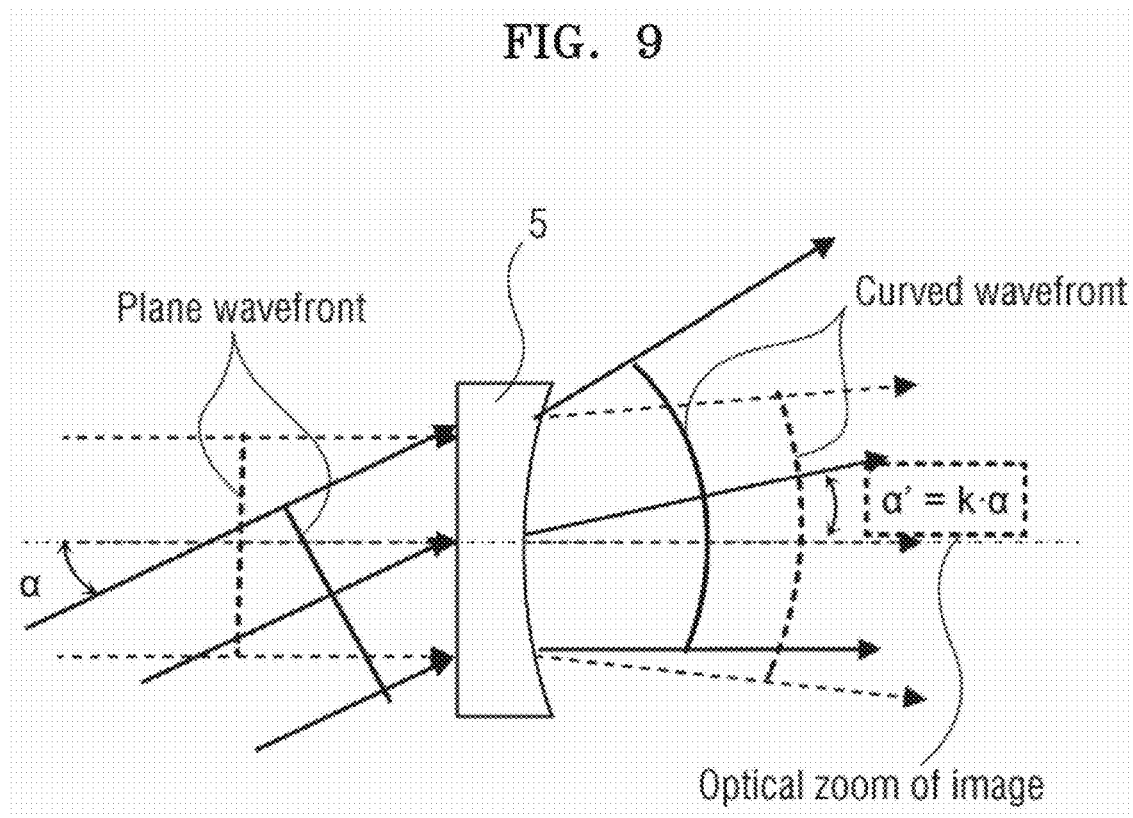
FIG. 9 illustrate an effect of an optical compensator with zoom and pre-distortion of two parallel beams according to an embodiment of the disclosure.

FIG. 9 illustrates an optical compensator 5 for changing image pre-distortion and image optical zoom according to an embodiment of the disclosure.

Referring to FIG. 9, the optical compensator 5 introduces pre-distortion and optical zoom to the image received from the projection system 1, the image pre-distortion and zoom being opposite to those that would be introduced by the flexible waveguide 4 to undistorted image in accordance with the user-selected radius of curvature of the flexible waveguide 4.

Therefore, all changes in the wavefront correspond to inverse distortions that will be introduced by the flexible waveguide 4 with a radius of curvature chosen by the user. It means that if, for example, the flexible waveguide 4 introduces a distortion in the form of image reduction, the optical compensator 5 must introduce a distortion in the form of image magnification. Or if, for example, due to the distortion inside the flexible waveguide 4, the beam becomes converging, i.e., rays converge to a point, then the optical compensator 5 introduces pre-distortions that make the wavefront diverging by the same amount by which the wavefront in the flexible waveguide 4 converges. Thereafter, the diverging beam, entering the flexible waveguide 4, will be compensated by it and become flat inside the flexible waveguide 4. For example, all the pre-distortions introduced by the optical compensator 5 should be opposite to the distortions introduced by the flexible waveguide 4.

Owing to the use of the optical compensator, the image seen by the user is free from defects, such as distortions, ghosting, or the like.

Referring to FIG. 9, two beams with angle α between them are incident on the optical compensator 5, and these two beams have plane wavefront. Having passed through the optical compensator 5, the beams will become diverging at an angle α'=kα, where factor k indicates the amount of distortion of the optical compensator, and the wavefront of the beams will become curved.

Figure 10:
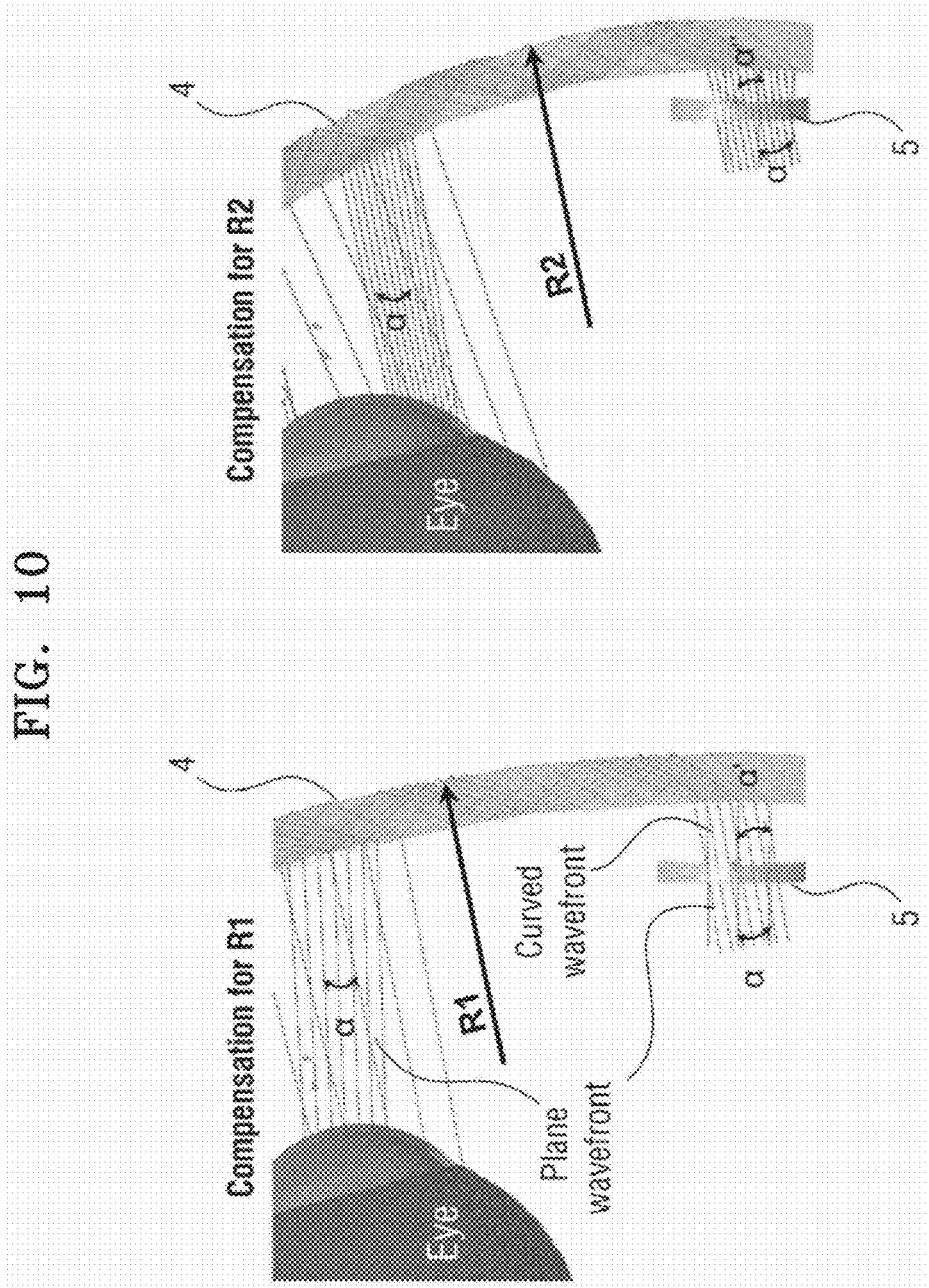
FIG. 10 illustrates an image compensation by an optical compensator depending on a radius of curvature of a waveguide according to an embodiment of the disclosure.

FIG. 10 illustrates an image compensation by an optical compensator depending on a radius of curvature of a waveguide according to an embodiment of the disclosure.

Referring to FIG. 10, having entered the flexible waveguide 4, the pre-distorted light will be completely compensated for by the distortion of the flexible waveguide 4. Therefore, two plane beams with angle α between them will be obtained at the exit from the flexible waveguide 4. It means that the pre-distortions introduced by the optical compensator 5 are completely dependent on the user-selected radius of curvature of the waveguide. Owing to the optical compensator 5, both in the case of distortion with the first radius R1 and in the case of distortion with the second radius R2, the image will enter the user's eye without distortion.

Figure 11:
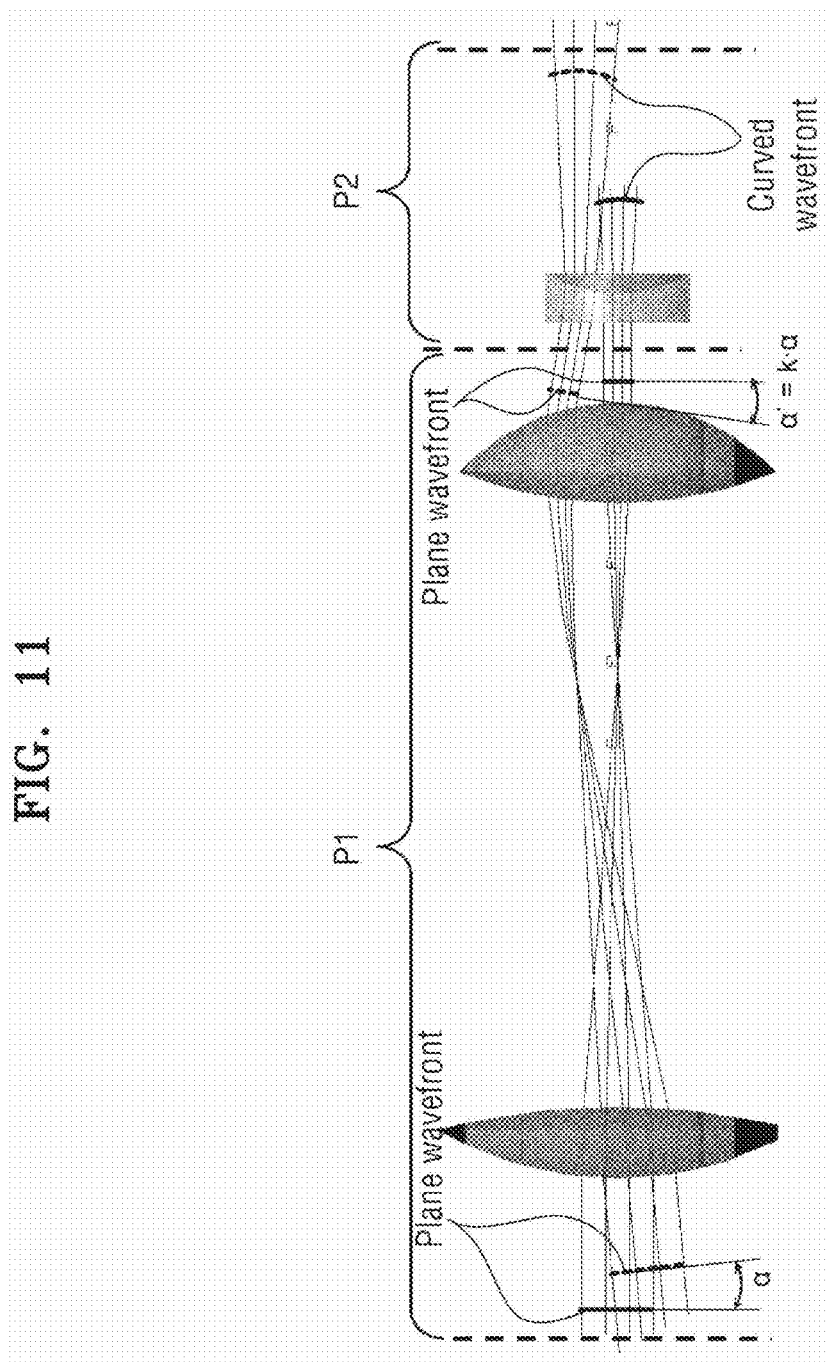
FIG. 11 is an embodiment of an optical compensator according to an embodiment of the disclosure.

FIG. 11 illustrates an embodiment of an optical compensator according to an embodiment of the disclosure.

Referring to FIG. 11, an optical compensator consists of two parts. First part P1 provides optical zoom, and second part P2 provides distortion of the wavefront. Two plane wavefronts with angle α between them are incident on the first part P1, at the exit from this part the angle changes to angle α'=kα, where k is the magnification factor. The magnification can be provided by various known ways, for example, due to the distance between the lenses or due to the variable curvature of the lenses themselves. The second part P2 of the optical compensator transforms the plane wavefront into curved wavefront.

The part in which optical zooming occurs, namely the first part P1 may consist of spherical, aspherical, cylindrical lenses, or any other suitable classical lens, between which the distance varies. The part in which pre-distortion of the image occurs, namely the second part P2 can consist of liquid lenses, liquid crystal lenses, polarization lenses, and having passed through such lenses, the light changes the wavefront radius of curvature. It is also possible to use adaptive optical elements e.g., micro-mirror elements. To create the optical compensator, any types of optical elements can be combined.

In one embodiment of the disclosure, for example, a cylindrical waveguide and an anamorphic tunable optical system are used for the optical compensator Anamorphic systems have different magnification and different optical power along orthogonal axes. The simplest anamorphic system is a cylindrical tunable lens. Anamorphic systems are used in conjunction with cylindrical waveguides. Thus, anamorphic optical system has different angular magnifications along different axes, and anamorphic tunable optical system bends the wavefront differently in different planes.

Figure 12:
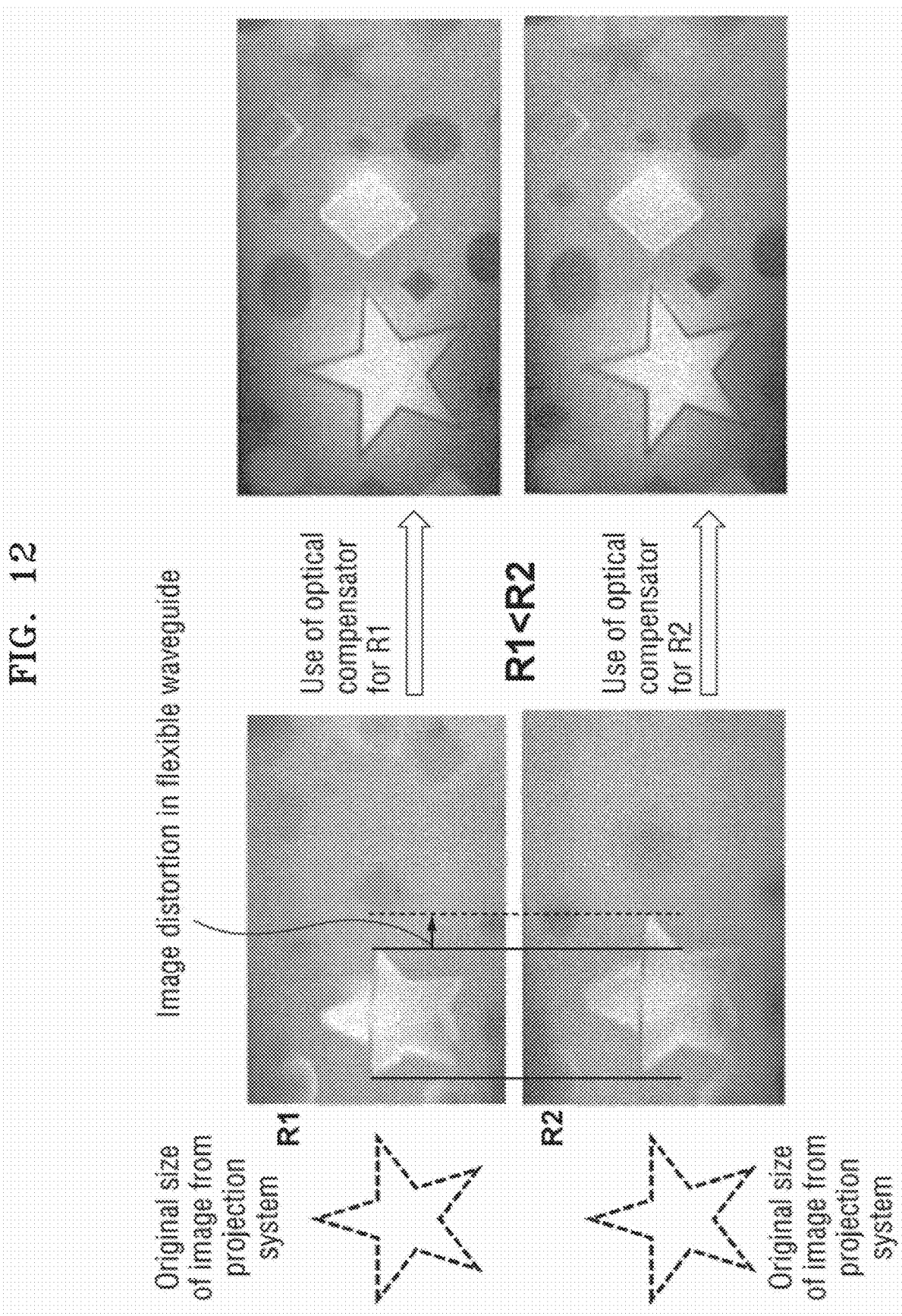
FIG. 12 illustrates an image quality after applying an optical compensator according to an embodiment of the disclosure.

FIG. 12 illustrates quality of an image after applying an optical compensator for different radii R1 and R2 of curvature of a flexible waveguide according to an embodiment of the disclosure.

Referring to FIG. 12, it can be seen that the star image generated by the projection system 1 has one size, and upon passing the image through a flexible waveguide 4 without the use of an optical compensator 5, the star size becomes smaller and its shape changes, and the image becomes blurred. When an optical compensator 5 is used, the optical zoom and the shape of the star image entering the user's eye remains the same as that generated by the projection system 1, and the optical compensator 5 works such that the radius of curvature of the flexible waveguide 4 does not affect quality of the image seen by the user.

For each radius of curvature of the flexible waveguide 4, corresponding optical compensation for distortions should be used. Therefore, the optical compensator 5 is configured to have variable image scaling and variable distortion compensation, corresponding to any waveguide radius of curvature chosen by the user.

An embodiment of the disclosure may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media and communication media. The computer storage media include both volatile and non-volatile, removable and non-removable media implemented in any method or technique for storing information such as computer readable instructions, data structures, program modules or other data. The communication medium may typically include computer-readable instructions, data structures, or other data of a modulated data signal such as program modules.

A computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

While the disclosure has been shown and described with reference to various embodiments thereof, it will be understood by those skilled in the art that various changes in form and details may be made therein without departing from the spirit and scope of the disclosure as defined by the appended claims and their equivalents.

Furthermore, the disclosure retains all the equivalents claimed, even if the claims are amended during prosecution.

What is claimed is:
1. An augmented reality display device comprising:
a first projection system and a second projection system;
a first optical compensator positioned behind the first projection system and a second optical compensator positioned behind the second projection system; and a flexible waveguide configured to change a radius of curvature, comprising two input diffraction gratings and two output diffraction gratings, wherein the first projection system and the second projection system are configured to project a first image onto the first optical compensator and a second image onto the second optical compensator, respectively, wherein the first optical compensator and the second optical compensator are configured to introduce pre-distortion and optical zoom to the first image and the second image to generate a first pre-processed image and a second pre-processed image, respectively, wherein the pre-distortion and the optical zoom introduced to the first image and the second image are opposite to distortion and optical zoom introduced by the flexible waveguide in accordance with a radius of the flexible waveguide, wherein a first input diffraction grating and a second input diffraction grating of the flexible waveguide are configured to input the first pre-processed image and the second pre-processed image having the pre-distortion and the optical zoom to the flexible waveguide, respectively, wherein the flexible waveguide is configured to compensate for the pre-distortion and the optical zoom of the first pre-processed image and the second pre-processed image by the first optical compensator and the second optical compensator to generate a first undistorted image and a second undistorted image, and wherein the first output diffraction grating and the second output diffraction grating of the flexible waveguide are configured to output the first undistorted image and the second undistorted image to eyes of a user of the augmented reality display device, respectively.

2. The display device of claim 1, further comprising:
a flexible frame that contains, secured therein, the first projection system, the second projection system, the first optical compensator, the second optical compensator and the flexible waveguide.

3. Augmented reality glasses comprising:
a flexible frame that contains, secured therein, a left eye element and a right eye element; and
a flexible waveguide configured to change a radius of curvature, the flexible waveguide including an input diffraction grating and an output diffraction grating,
wherein each of the left and right eye elements include:
  a portion of the flexible waveguide,
  a projection system, and
  an optical compensator positioned behind the projection system,
  wherein the projection system is configured to project an image onto the optical compensator,
  wherein the optical compensator is configured to introduce pre-distortion and optical zoom to the image to generate a pre-processed image,
  wherein the pre-distortion and the optical zoom introduced to the image are opposite to distortion and optical zoom introduced by the flexible waveguide in accordance with a radius of the flexible waveguide,
  wherein the input diffraction grating of the flexible waveguide is configured to input the pre-processed image having the pre-distortion and the optical zoom to the flexible waveguide,
  wherein the flexible waveguide is configured to compensate for the pre-distortion and the optical zoom of the pre-processed image by the optical compensator to generate an undistorted image, and
  wherein the output diffraction grating of the flexible waveguide is configured to output the undistorted image to eyes of a user of the augmented reality glasses, and
wherein the flexible waveguide of each of the right eye element and left eye element is positioned such that the undistorted image is output to a user's eyes.

4. The glasses of claim 3, wherein the projection system is positioned in a user's temporal region.

5. The glasses of claim 4, further comprising:
an optical compensator regulator configured to enable the user to adjust the optical compensator for introducing pre-distortions to the image and optically zooming the image received from the projection system,
wherein the user adjusts the optical compensator until the undistorted image is seen.

6. The glasses of claim 4, further comprising:
a control interface;
a control system;
an actuator; and
curvature sensors,
wherein the curvature sensors are configured to determine a current radius of curvature of the waveguide and transmit the current radius of curvature to the control system, and
wherein the control interface is configured to:
  receive a value of the radius of curvature of the waveguide from the user,
  transmit a signal to the control system to change the radius of curvature of the waveguide,
  control the actuator in response to the signal from the control interface, the actuator being adapted to change the radius of curvature of the flexible waveguide by changing the curvature of the flexible frame, and
  calculate and generate control signals for the optical compensator to cause the optical compensator to introduce pre-distortions to the image and optically zoom the image, opposite to the distortions and the optical zoom introduced by the flexible waveguide, in accordance with the radius of curvature of the flexible waveguide.

* * * * *